United States Patent
Wisinger, Jr.

(10) Patent No.: US 11,111,783 B2
(45) Date of Patent: Sep. 7, 2021

(54) ESTIMATING FORMATION PROPERTIES FROM DRILL BIT MOTION

(71) Applicant: Halliburton Energy Services, Inc., Houston, TX (US)

(72) Inventor: John Leslie Wisinger, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 55 days.

(21) Appl. No.: 16/533,121

(22) Filed: Aug. 6, 2019

(65) Prior Publication Data

US 2021/0040844 A1 Feb. 11, 2021

(51) Int. Cl.
  *E21B 49/00* (2006.01)
  *G01V 9/00* (2006.01)
  *E21B 45/00* (2006.01)
  *E21B 47/024* (2006.01)

(52) U.S. Cl.
  CPC ............ *E21B 49/003* (2013.01); *E21B 45/00* (2013.01); *E21B 47/024* (2013.01); *G01V 9/00* (2013.01)

(58) Field of Classification Search
  CPC ........ E21B 44/00; E21B 47/00; E21B 49/003; E21B 45/00; E21B 7/00; G01V 11/00
  See application file for complete search history.

(56) References Cited

U.S. PATENT DOCUMENTS

| | | | |
|---|---|---|---|
| 5,720,355 A * | 2/1998 | Lamine | E21B 10/60 175/27 |
| 6,065,219 A * | 5/2000 | Murphey | E21B 47/085 33/544 |
| 6,205,851 B1 * | 3/2001 | Jogi | E21B 44/005 175/39 |
| 8,087,477 B2 | 1/2012 | Sullivan et al. | |
| 8,215,384 B2 | 7/2012 | Trinh et al. | |
| 8,245,792 B2 | 8/2012 | Trinh et al. | |

(Continued)

FOREIGN PATENT DOCUMENTS

JP 2018141280 9/2018

OTHER PUBLICATIONS

International Search Report and Written Opinion for Application No. PCT/US2019/045295, dated May 6, 2020.
Halliburton. "Cerebro In-Bit Sensor Package." 2018.

*Primary Examiner* — Kipp C Wallace
(74) *Attorney, Agent, or Firm* — Thomas Rooney; C. Tumey Law Group PLLC

(57) ABSTRACT

A method for formation property prediction may comprise drilling a borehole into a formation using a drill bit, measuring one or more parameters of drill bit motion, and inputting the one or more parameters of the drill bit motion into a formation property prediction model which outputs one or more properties of the formation. Another method may for forming a formation property model may comprise acquiring one or more formation properties and one or more parameters of drill bit motion, forming one or more data packets, and correlating the one or more data packets in the database to form the formation property prediction model that predicts a formation property based at least in part on drill bit measurements. A system may comprise a drill bit, gyroscope unit coupled to the drill bit in a known positional relationship, a magnetometer unit coupled to the drill bit, and an information handling system.

20 Claims, 5 Drawing Sheets

(56) References Cited

U.S. PATENT DOCUMENTS

| | | |
|---|---|---|
| 9,238,958 B2 | 1/2016 | Teodorescu |
| 9,664,039 B2 | 5/2017 | Neale et al. |
| 9,678,236 B2 | 6/2017 | Rodney et al. |
| 10,132,162 B2 | 11/2018 | Neale et al. |
| 2006/0212224 A1* | 9/2006 | Jogi ........................ G01V 1/40 702/9 |
| 2010/0300756 A1 | 12/2010 | Bergstrom et al. |
| 2011/0253448 A1 | 10/2011 | Trinh et al. |
| 2012/0222901 A1* | 9/2012 | Pei ........................ E21B 49/003 175/56 |
| 2016/0369612 A1* | 12/2016 | Zha ........................ E21B 44/00 |
| 2017/0101866 A1 | 4/2017 | Hollstein et al. |

\* cited by examiner

ESTIMATING FORMATION PROPERTIES FROM DRILL BIT MOTION

BACKGROUND

Wells may be drilled into subterranean formations to recover natural deposits of hydrocarbons and other desirable materials trapped in geological formations in the Earth's crust. Wells may be drilled by rotating a drill bit which may be located on a bottom hole assembly at a distal end of a drill string. During drilling operations, the drill bit may encounter different formations. Each formation may cause the drill bit to reach and behave differently.

To determine how the drill bit reacts and behaves in a formation different measurement may be taken. A wide variety of sensors may be used, including gyroscopes and magnetometers, to measure the motion of the drill bit during drilling operations. However, the measurements of dill bit motion may be useless of not stored and accessible for further drilling operations.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to determining formation properties from drill bit motion measurements. More particularly, examples may relate to methods for inputting bit motion measurements into a formation property prediction model which may provide an output of formation properties. Additionally, methods may include forming a database from data packets, which may be used to form and update the formation property prediction model. Systems for taking drill bit motion measurements may include a gyroscope, accelerometers, magnetometers, strain gauges, and/or the like In some instances, angular velocity may be measured from which position (e.g., orientation) of the drill bit.

Figure 1:
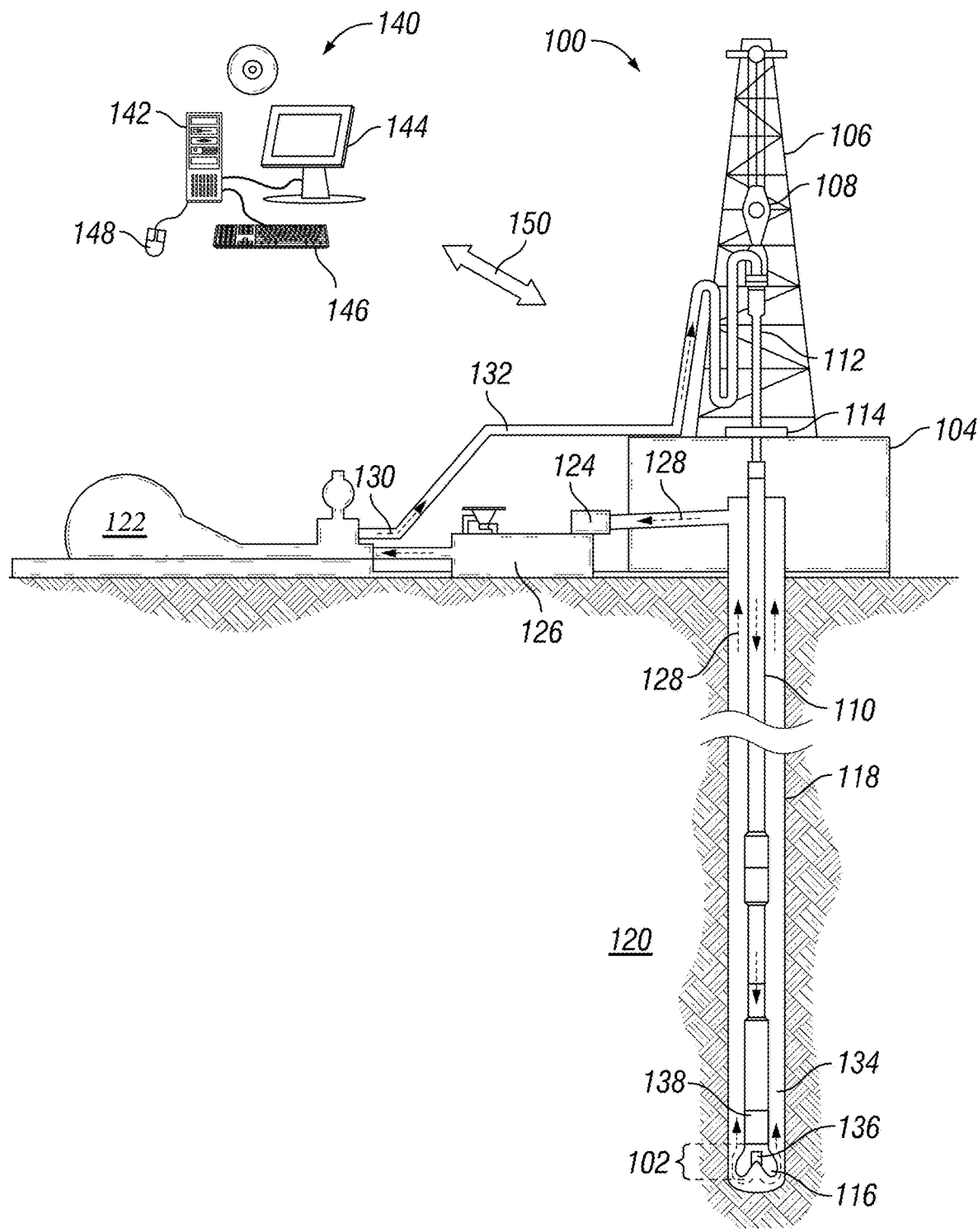
FIG. 1 illustrates an example of a drilling system.

FIG. 1 illustrates a drilling system 100 that may include a bit-motion-measurement-drilling system 102. As will be discussed in more detail below, bit-motion-measurement-drilling system 102 may provide measurements of a drill bits movements while drilling. Using bit motion measurements and a formation prediction model, properties of formations in which the drill bit may pass through during drilling operations may be identified. It should be noted that while FIG. 1 generally depicts drilling system 100 in the form of a land-based system, those skilled in the art will readily recognize that the principles described herein are equally applicable to subsea drilling operations that employ floating or sea-based platforms and rigs, without departing from the scope of the disclosure.

Drilling system 100 may include a drilling platform 104 that supports a derrick 106 having a traveling block 108 for raising and lowering a drill string 110. A kelly 112 may support drill string 110 as drill string 110 may be lowered through a rotary table 114. Bit-motion-measurement-drilling system 102 may include a drill bit 116 attached to the distal end of drill string 110 and may be driven either by a downhole motor (not shown) and/or via rotation of drill string 110. Without limitation, drill bit 116 may include any suitable type of drill bit 116, including, but not limited to, roller cone bits, PDC bits, natural diamond bits, any hole openers, reamers, coring bits, and the like. As drill bit 116 rotates, drill bit 116 may create a borehole 118 that penetrates various formations 120.

Drilling system 100 may further include a mud pump 122, one or more solids control systems 124, and a retention pit 126. Mud pump 122 representatively may include any conduits, pipelines, trucks, tubulars, and/or pipes used to fluidically convey drilling fluid 128 downhole, any pumps, compressors, or motors (e.g., topside or downhole) used to drive the drilling fluid 128 into motion, any valves or related joints used to regulate the pressure or flow rate of drilling fluid 128, any sensors (e.g., pressure, temperature, flow rate, etc.), gauges, and/or combinations thereof, and the like.

Mud pump 122 may circulate drilling fluid 128 through a feed conduit 175 and to kelly 112, which may convey drilling fluid 128 downhole through the interior of drill string 110 and through one or more orifices (not shown) in drill bit 116. Drilling fluid 128 may then be circulated back to surface 134 via a borehole annulus 130 defined between drill string 110 and the walls of borehole 118. At surface 134, the recirculated or spent drilling fluid 128 may exit borehole annulus 130 and may be conveyed to one or more solids control system 124 via an interconnecting flow line 132. One or more solids control systems 124 may include, but are not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The one or more solids control systems 124 may further include one or more sensors, gauges, pumps, compressors, and the like used to store, monitor, regulate, and/or recondition the drilling fluid 128.

After passing through the one or more solids control systems 124, drilling fluid 128 may be deposited into a retention pit 126 (e.g., a mud pit). While illustrated as being arranged at the outlet of borehole 118 via borehole annulus 130, those skilled in the art will readily appreciate that the one or more solids controls system 124 may be arranged at any other location in drilling system 100 to facilitate its proper function, without departing from the scope of the disclosure. While FIG. 1 shows only a single retention pit 126, there could be more than one retention pit 126, such as multiple retention pits 126 in series. Moreover, retention pit 126 may be representative of one or more fluid storage facilities and/or units where the drilling fluid additives may be stored, reconditioned, and/or regulated until added to drilling fluid 128.

Bit-motion-measurement-drilling system 102 may include drill bit 116 and a gyroscope unit 136. Gyroscope unit 136 may be coupled to drill bit 116. In particular, gyroscope unit 136 may be fixedly coupled to drill bit 116 so that there may be a known relationship between the location of gyroscope unit 136 and the geometry of drill bit 116. Gyroscope unit 136 may be a three-axis gyroscope to provide measurements of angular velocity about the x-, y-, and z-axes (e.g. x, y, and z axes shown on FIG. 2) of gyroscope unit 136. These angular velocities may also be referred to as the pitch velocity, roll velocity, and yaw velocity. The x-, y-, and z-axes of gyroscope unit 136 may (or may not) correspond with the x-, y-, and z-axes of drill bit 116. In addition, bit-motion-measurement-drilling system 102 may include additional sensors including, but not limited to, strain gauges (e.g., strain gauge unit 304 on FIG. 3), vibration sensors (e.g., vibration sensor unit 302 on FIG. 3), and magnetometers (e.g., magnetometer unit 300 on FIG. 3). The gyroscope (or other sensor) measurements may be stored in a conventional downhole recorder (not shown), which can be accessed at surface 134 when bit-motion-measurement-drilling system 102 is retrieved.

In addition, bit-motion-measurement-drilling system 102 may further include communication module 138. Communication module 138 may be configured to transmit information to surface 134. While not shown, communication module 138 may also transmit information to other portions of the bottom hole assembly (e.g., rotary steerable system) or a data collection system further up the bottomhole assembly. For example, communication module 138 may transmit gyroscope measurements and/or additional sensor measurements from bit-motion-measurement-drilling system 102. In addition, where processing occurs at least partially downhole, communication module 138 may transmit the processed (and/or partially processed measurements) to surface 134. Information may be transmitted from communication module 138 to surface 134 using any suitable unidirectional or bidirectional wired or wireless telemetry system, including, but not limited to, an electrical conductor, a fiber optic cable, acoustic telemetry, electromagnetic telemetry, pressure pulse telemetry, combinations thereof or the like. Communication module 138 may include a variety of different devices to facilitate communication to surface, including, but not limited to, a powerline transceiver, a mud pulse valve, an optical transceiver, a piezoelectric actuator, a solenoid, a toroid, or an RF transceiver, among others.

Bit-motion-measurement-drilling system 102 may further include information handling system 140 configured for processing the measurements from gyroscope unit 136 and/or the additional sensors (where present). As illustrated, information handling system 140 may be disposed at surface 134. In examples, information handling system 140 may be disposed downhole. Any suitable technique may be used for transmitting signals from communication module 138 to information handling system 140. A communication link 150 (which may be wired, wireless, or combinations thereof, for example) may be provided that may transmit data from communication module 138 to information handling system 140. Without limitation, information handling system 140 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, information handling system 140 may be a personal computer, a network storage device, or any other suitable device and may vary in size, shape, performance, functionality, and price. Information handling system 140 may include random access memory (RAM), one or more processing resources (e.g. a microprocessor) such as a central processing unit 142 (CPU) or hardware or software control logic, ROM, and/or other types of nonvolatile memory. Additional components of information handling system 140 may include one or more of a monitor 144, an input device 146 (e.g., keyboard, mouse, etc.) as well as computer media 148 (e.g., optical disks, magnetic disks) that may store code representative of the methods described herein. Information handling system 140 may also include one or more buses (not shown) operable to transmit communications between the various hardware components.

Figure 2:
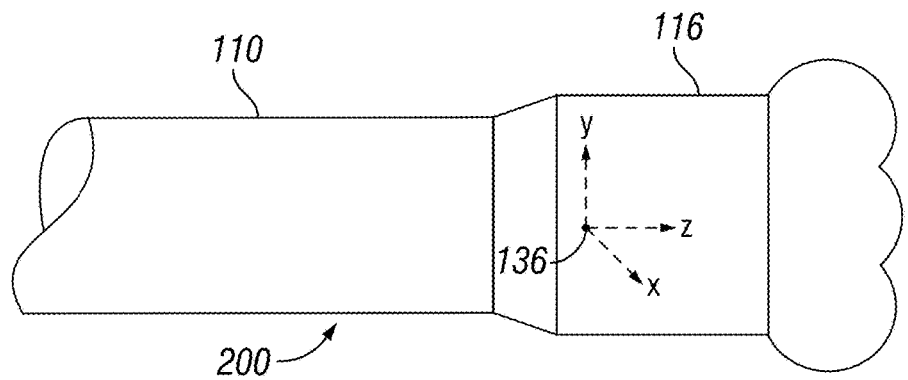
FIG. 2 illustrates an example of a drill bit installed on drill string with a gyroscope unit.
Figure 3:
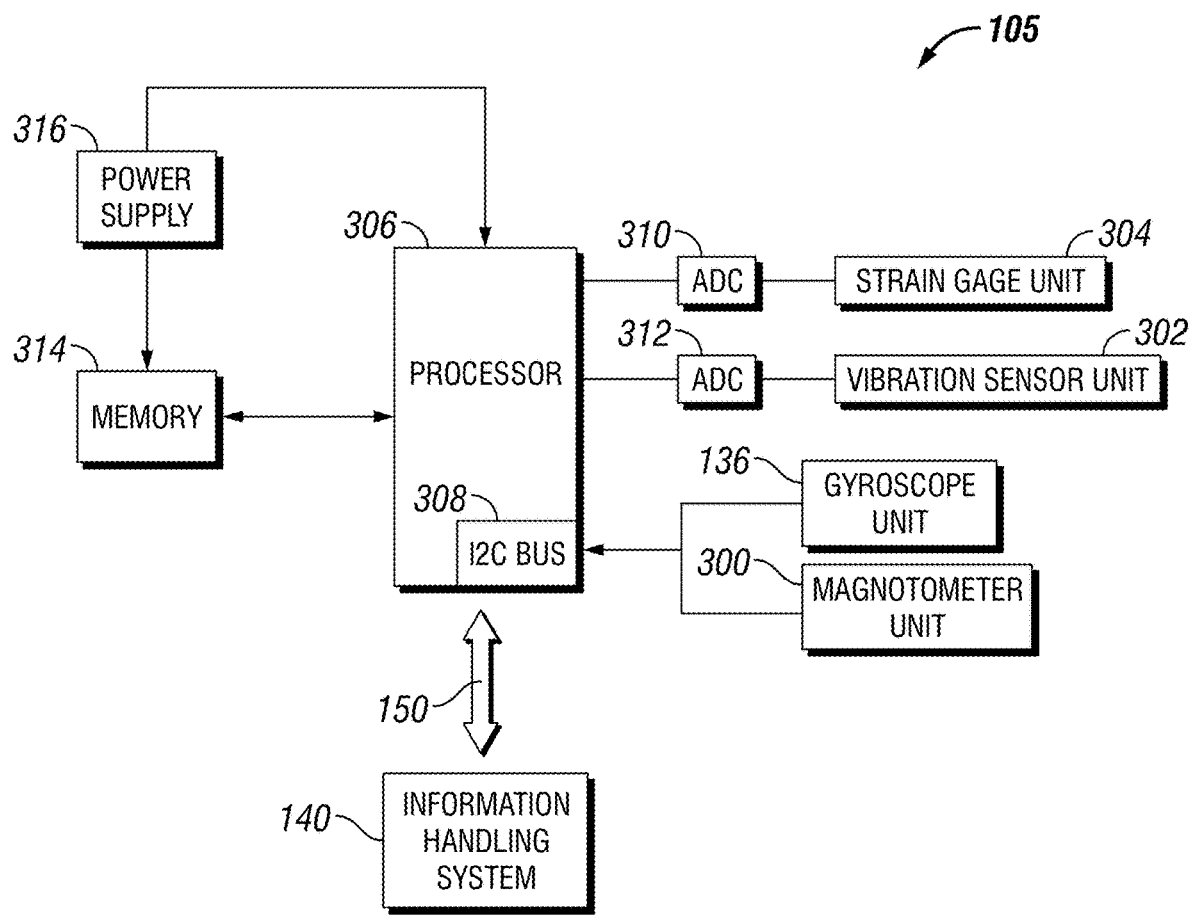
FIG. 3 illustrates a schematic diagram of an example embodiment of a bit-motion-measurement-drilling system.

FIG. 2 illustrates installation of drill bit 116 on drill string 110 in more detail. As illustrated, drill bit 116 may be coupled to distal end 200 of drill string 110. Gyroscope unit 136 may be coupled to drill bit 116. Gyroscope unit 136 may be a three-axis gyroscope to provide measurements of angular velocity about the x-, y-, and z-axes of gyroscope unit 136 illustrated on FIG. 2 as x, y, and z. While not shown, gyroscope unit 136 may alternatively be implemented as three separate single axis gyroscopes. Where separate gyroscopes are used, the gyroscopes may be deployed at the same or different locations in the drill bit 116 with each gyroscope aligned in a radial direction. As FIG. 3 is a schematic diagram of an illustrative bit-motion-measurement-drilling system 102. Bit-motion-measurement-drilling system 102 may include gyroscope unit 136 and one or more additional sensors, including, but not limited to, magnetometer unit 300, vibration sensor unit 302, and/or strain gauge unit 304. Gyroscope unit 136 may be coupled to processor 306 by way of a communication link, such as an I2C (Inter-IC) bus 308. Magnetometer unit 300 may include any suitable magnetometer, including, but not limited to, a three-axis magnetometer. Magnetometer unit 300 may take magnetic field measurements, including measurements of vector components and/or magnitude. Magnetometer unit 300 may be coupled to processor 306 by way of a communication link, such as I2C (Inter-IC) bus 308. Vibration sensor unit 302 may include any suitable sensor for measuring vibration, including an accelerometer. Vibration sensor unit 302 may provide measurements of linear velocity and/or acceleration, among others. Vibration sensor unit 302 may be coupled to processor 306 by way of first analog-to-digital converter 310. Strain gauge unit 304 may include any suitable sensor for measuring strain on drill bit 116 (e.g., shown on FIGS. 1 and 2). Strain gauge unit 304 may be coupled to processor 306 by way of second analog-to-digital converter 312.

Processor 306 may include any suitable processor or microprocessor, including, but not limited to, a digital signal processor. Processor 306 may receive measurements from gyroscope unit 136, as well as magnetometer unit 300, vibration sensor unit 302, and strain gauge unit 304, where available. Among other functions, processor 306 may collect data from the different sensors and store it, or apply any set of mathematical equations to determine motion of the device or statistical significance of the data. Processor 306 may be coupled to memory 314. The measurements received by processor 306 may be stored in memory 314. Memory 314 may include any suitable type of memory, including, but not limited to RAM memory and flash memory. Bit-motion-measurement-drilling system 102 may further include power supply 316. Power supply 316 may supply power to components of bit-motion-measurement-drilling system 102, including memory 314 and processor 306. Any suitable power supply 316 may be used, including, but not limited to, batteries, capacitors, turbines and wired or wireless power delivered from higher up in the bottom hole assembly.

Measurements from the sensors, including gyroscope unit 136, magnetometer unit 300, vibration sensor unit 302, and/or strain gauge unit 304 may be transmitted to information handling system 140 and input into a formation property prediction model, which outputs estimated properties of the formation 120. The measurements may be transmitted from bit-motion-measurement-drilling system 102 in borehole 118 (e.g., shown on FIG. 1) or, alternatively, may be stored downhole with transmission to information handling system 140 after recovery of bit-motion-measurement-drilling system 102 from borehole 118. Communication link 150, which may be wired or wireless, may transmit information from processor 306 to information handling system 140.

Figure 4:
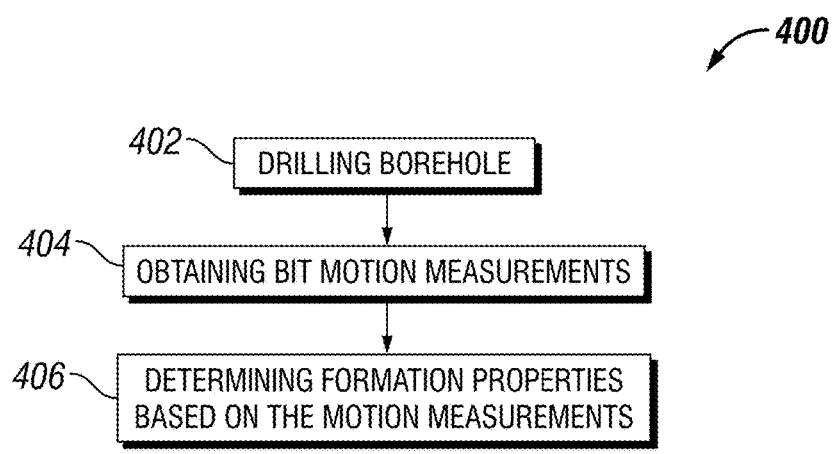
FIG. 4 is a flow diagram of an example of a method for making caliper measurements while drilling.

FIG. 4 is a flow diagram of an example method 400 that may be implemented using the techniques disclosed herein in determining properties of a formation based at least in part on the motion and behavior of a drill bit 116 during drilling operations. At block 402, the method may include drilling borehole 118 through formation 120 (e.g., shown on FIG. 1). At block 404, the method may include obtaining bit motion measurements. At block 406, the method may include determining properties of formation 120 based on the bit motion measurements.

In block 402, the method may include drilling borehole 118 through formation 120 (e.g., shown on FIG. 1). As shown on FIG. 1, drill bit 116 may be disposed in borehole 118 so as drill bit 116 rotates in drilling borehole 118, drill bit 116 advances in borehole 118. As drill bit 116 advance in borehole 118, the drill bit 116 may exhibit a variety of different motion types.

Figure 6:
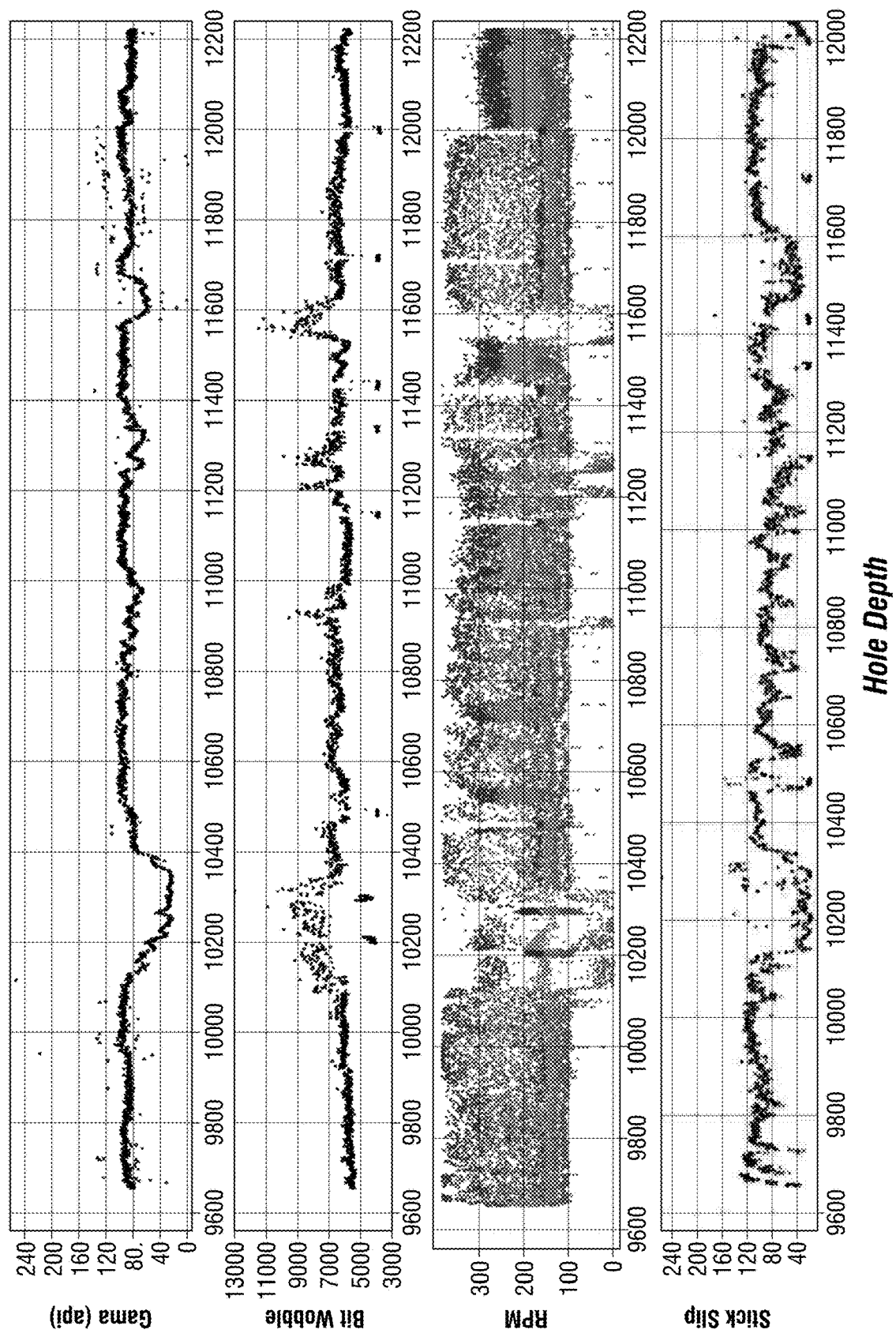
FIG. 6 are graphs showing measurements of drill bit motion.
Figure 7:
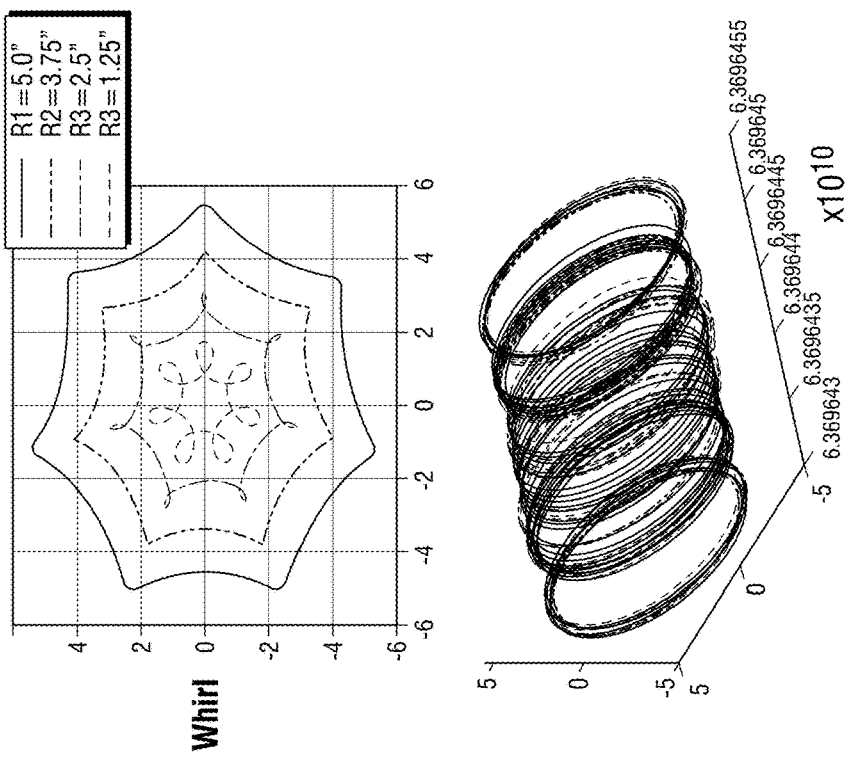
FIG. 7 illustrates the different types of drill bit motion.
Figure 7:
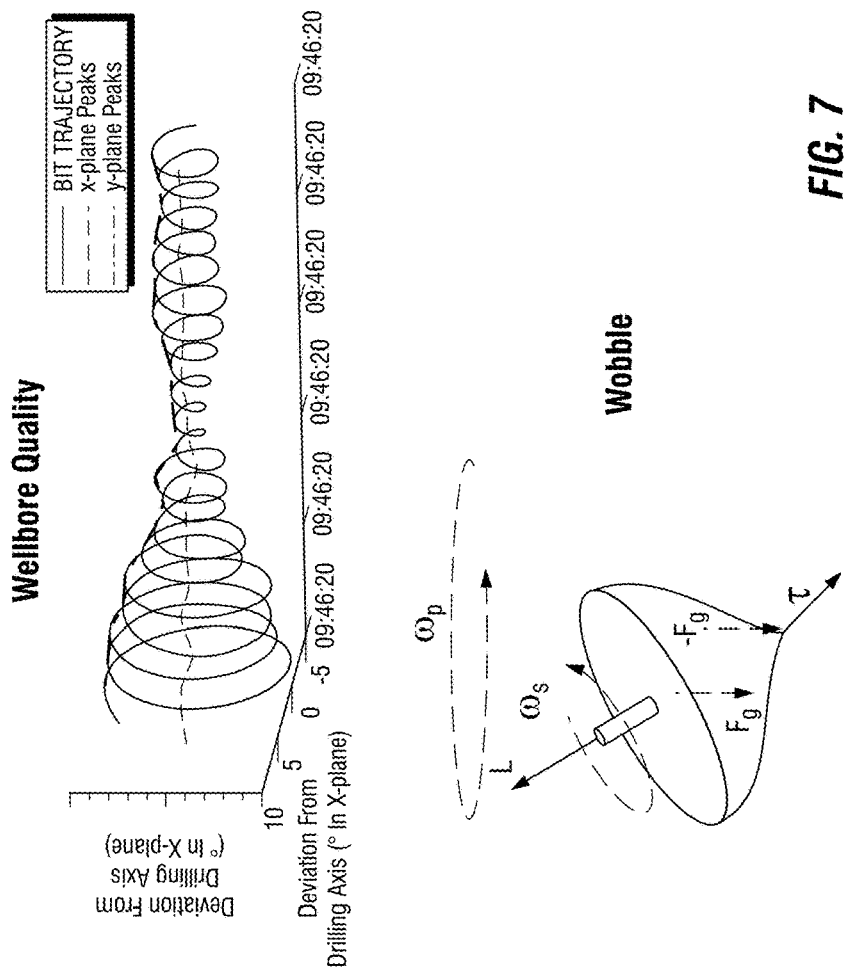

In block 404, the different drill bit 116 motion types may be measured and recorded. These drill bit 116 motion types may include, but are not limited to, bit whirl, bit wobble, stick slip, vibration, and rotation. Bit whirl refers to motion that drill bit 116 makes when it does not rotate about its center. This may produce irregular boreholes 118 and damage to drill bit 116. As used herein, bit whirl is defined as the instantaneous center of rotation moves around the face of drill bit 116, and the drill bit 116 whirls backwards around borehole 118. Bit wobble refers to drill bit 116 tilting at a top of drill bit 116 while a bottom of drill bit 116 remains centered in borehole 118. As used herein, bit wobble is defined as the amount of tilt of drill bit 116 versus the centerline of borehole 118 (e.g., referring to FIG. 1). Stick slip refers to when drill bit 116 becomes stationary due to torsional oscillation of drill string 110 and then drill bit 116 accelerates as the energy stored within drill string 110 due to the torsional oscillation is released. Without limitation, bit wobble may be measured by with accelerometers, magnetometer unit 300, and gyroscope unit 136. Additionally, gyroscope unit 136 may measure "pitch and yaw" for bit wobble measurements. The measurement may be made with any single sensor, or using sensor fusion, which may be combined into a single unified model. In at least one embodiment, the stick slip may be quantified as the maximum roll revolutions per minute (RPM) minus the minimum roll RPM all over and divided by average RPM. Rotation of the drill bit 116 may be quantified by RPM. RPM may be measured by accelerometers, magnetometer unit 300, or gyroscope unit 136. Without limitation, gyroscope unit 136 may measure "roll" for RPM measurements. Without limitation, stick slip measurements may be measured by measured with accelerometers, magnetometer unit 300, or gyroscope unit 136 as stick slip measurements are calculations based on RPM measurements. FIG. 6 illustrates graphs of measurements and information from bit wobble measurements, revolutions-per-minute (RPM) measurements, stick slip measurements, and gamma concentration measurements. FIG. 7 further illustrates different motion the drill bit 116 (e.g., referring to FIG. 1) may experience in drilling operations.

Additionally, in block 404, method 400 may include measuring angular velocity about at least two axes. The angular velocity may be measured during the drilling, for example, while rotating drill bit 116 to advance drill bit 116. As noted above, the angular velocity may be obtained using gyroscope unit 136 (e.g., shown on FIG. 1) coupled to drill bit 116 in a known positional relationship. Gyroscope measurements may include measurements of angular velocity (pitch rate, roll rate, yaw rate) about the x-, y-, and z-axes of gyroscope unit 136 (e.g., x, y, and z axes on FIG. 2). Each measurement separately and/or concurrently may identify how drill bit 116 (e.g., referring to FIG. 1) may react upon drilling into different formations 120 during drilling operations.

In block 406, formation properties are determined based at least in part on drill bit 116 motion measurements. This may be accomplished utilizing a database and previously known and/or collected information. The database may store known properties of an identified formation 120 that are associated with how drill bit 116 reacts when drill bit 116 encounters those properties. Properties stored in the database may be density, porosity, hole shape, rock strength, gamma reading, and/or the like. This information may be stored as data packets within the database. In examples, drill bit 116 motion measurements and formation properties may be known knowledge that has already been recorded, without the need for current drilling operations to form the database. Within the database, the data packets may be correlated to form a formation property prediction model that predicts a formation property based at least in part on drill bit 116 measurements.

During drilling operations, the formation property prediction model may be stored on information handling system 140. As drill bit 116 motion measurements are taken, they are input into the formation property prediction model. The formation property prediction model may then predict the formation properties drill bit 116 is encountering or will encounter. Based on this prediction, drilling personnel during drilling operations may alter drill paths, drill operations, and/or the like within the formation.

Additionally, as new properties of a formation 120 are encountered, the database may be updated with drill bit 116 motion measurements that are specific to the new property of formation 120. An updated database may further update the formation property prediction model. This may allow future drilling operations to have a robust database and formation property prediction model upon which to determine properties of a formation 120. For example, during a separate drilling operation a drill bit may encounter a formation that may cause drill bit 116 to react and/or behave in a manner measured previously. This behavior may be matched in the database to determine the properties of formation 120 that drill bit 116 may be experiencing during drilling operations. Without limitation, machine learning and/or pattern matching may be used to quickly identify measurements in the database that may be associated with behaviors exhibited by drill bit 116.

Figure 5:
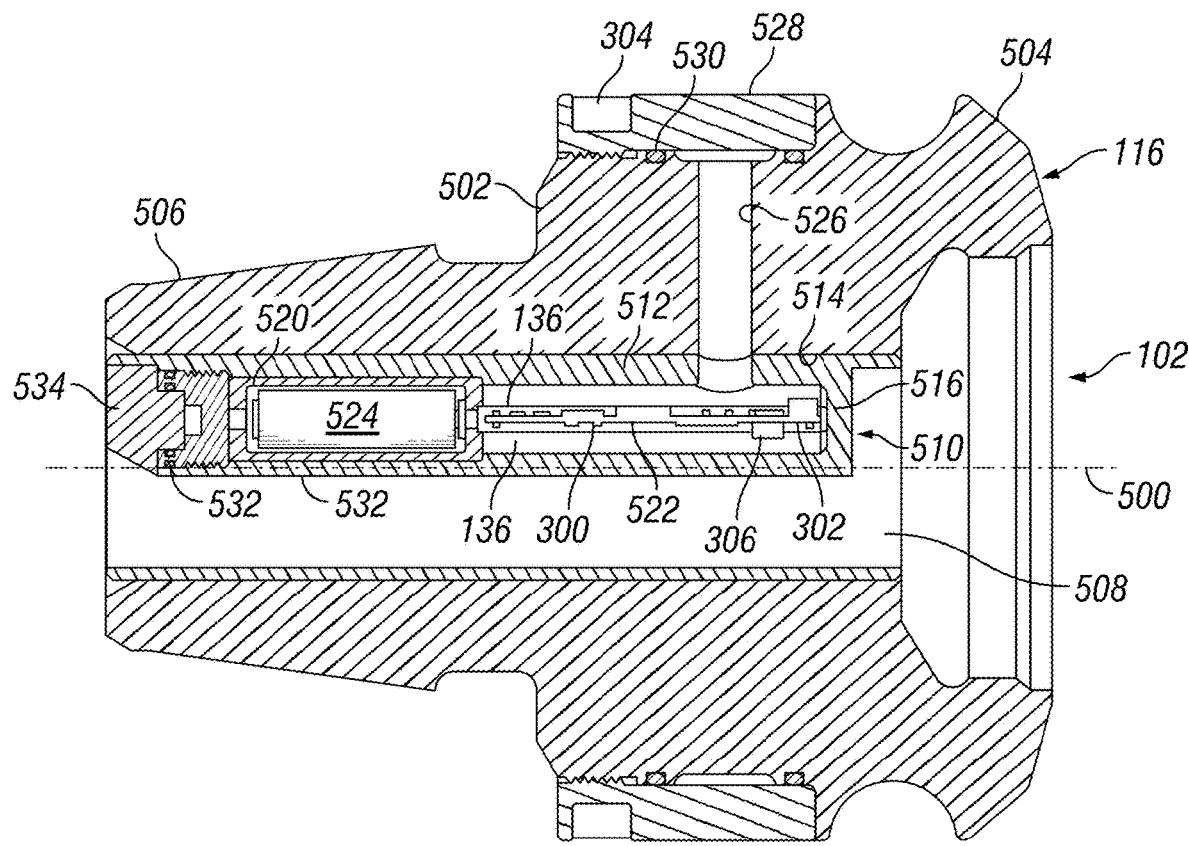
FIG. 5 illustrates a cut away of a drill bit and the location of the bit-motion-measurement-drilling system.

FIG. 5 illustrates a cross-sectional view of an example embodiment of bit-motion-measurement-drilling system 102 taken along longitudinal axis 500 of drill bit 116. Any suitable type of drill bit 116 may be used with bit-motion-measurement-drilling system, including, but not limited to, roller cone bits, PDC bits, natural diamond bits, any hole openers, reamers, coring bits, and the like. Drill bit 116 may include a bit body 502, cutting elements 504, and shank 506. Shank 506 may be the portion of drill bit 105 secured to drill string 110 (e.g., FIGS. 1 and 2) by which drill bit 116 may be held and drive. Bit body 502 may be the portion of drill bit 105 that extends from shank 506 to cutting elements 504. Cutting elements 504 may be disposed on bit body 502 and engage rock. Cutting elements 504 may have any suitable shape, including, but not limited to, tooth-shape, cone-shaped, or otherwise formed. Through bore 508 may extend through bit body 502 and shank 506. As illustrated, through bore 508 may extend along longitudinal axis 500, for example, to provide a pathway for fluid travel (e.g. drilling fluid) through drill bit 105.

Sensor subassembly 510 may be disposed in through bore 508. Sensor subassembly 510 may include insert 512. Insert 512 may be secured to inner wall 514 of through bore 508. Any suitable technique may be used for securing insert 512 to inner wall 514, including, but not limited to, mechanical fasteners and welding, among others. While insert 512 may have any suitable shape, in some implementations, insert 512 may be cylindrical in form. Sensor subassembly 510 may include housing 516. Housing 516 may also include sidewalls 532 and end cap 534 to at least partially define interior of housing 516. Seals 536 may be used to provide that housing 516 may be fluid tight. Housing 516 may include one or more compartments, including, but not limited to, sensor compartment 518 and battery compartment 520. Circuit board 522 may be disposed in sensor compartment 518. Any suitable type of circuit board 522 may be used, including, but not limited to, printed circuit boards, which may be rigid or flexible. Circuit board 522 may include electronics for implementation of caliper measurements. For example, circuit board 522 may include gyroscope unit 136, magnetometer unit 300, and/or vibration sensor unit 302. Circuit board 522 may also include processor 306. Battery 524 may be disposed in battery compartment 520. Any suitable type of battery 524 may be used, including, but not limited to, lithium thionyl chloride batteries, lithium manganese dioxide batteries, lithium-ion batteries, alkaline batteries, nickel-cadmium batteries, and nickel-metal hydride batteries, among others. As previously described, bit-motion-measurement-drilling system 102 may also include strain gauge unit 304. As illustrated, strain gauge unit 304 may be disposed on bit body 502 to determine strain experienced by bit body 502 during drilling. Channel 526 may be provided in bit body 502 for wires from strain gauge unit 304 to couple with circuit board 522. Cover 528 may be disposed on channel 526, for example, to hold downhole pressure and prevent fluid from entering through bore 508 while seals 530 may provide additional sealing to prevent fluid ingress.

The systems and methods for identifying properties of a formation from motion measurements of a drill bit may include any of the various features of the systems and methods disclosed herein, including one or more of the following statements.

Statement 1. A method for formation property prediction may comprise drilling a borehole into a formation using a drill bit, measuring one or more parameters of drill bit motion, and inputting the one or more parameters of the drill bit motion into a formation property prediction model which outputs one or more properties of the formation.

Statement 2. The method of statement 1, further including altering the drilling of the borehole based at least in part on the outputs of the one or more properties of the formation.

Statement 3. The method of statements 1 or 2, wherein the formation property prediction model outputs gamma concentration, wherein the one or more parameters of the drill bit motion include at least one a bit wobble, a bit whirl, or revolutions-per-minute.

Statement 4. The method of statements 1-3, wherein the formation property prediction model outputs hole shape, wherein the one or more parameters include at least one of a bit whirl or a bit wobble.

Statement 5. The method of statements 1-4, further including updating the formation property prediction model with one or more additional drill bit measurements.

Statement 6. The method of statement 5, wherein the one or more parameters of the drill bit motion are measured with at least one of an accelerometer, a magnetometer unit, or a gyroscope unit.

Statement 7. The method of statements 1-5, wherein the one or more parameters of the drill bit motion are measured with a gyroscope unit configured to measure pitch and yaw of the drill bit.

Statement 8. A method for forming a formation property model may comprise acquiring one or more formation properties and one or more parameters of drill bit motion, forming one or more data packets that comprise the one or more formation properties and the one or more parameters of drill bit motion, storing the one or more data packets in a database, and correlating the one or more data packets in the database to form the formation property prediction model that predicts a formation property based at least in part on drill bit measurements.

Statement 9. The method of statement 8, further comprising updating the data packets with the drill bit measurements.

Statement 10. The method of statements 8 or 9, wherein the formation property prediction model predicts gamma concentration in response to an input of at least one a bit wobble, a bit whirl, or revolutions-per-minute.

Statement 11. The method of statements 8-10, wherein the formation property prediction model outputs hole shape in response to an input of at least one of a bit whirl or a bit wobble.

Statement 12. A system may comprise a drill bit, a gyroscope unit coupled to the drill bit in a known positional relationship, a magnetometer unit coupled to the drill bit, and an information handling system. The information handling system may be configured to record one or more parameters of a drill bit motion from at least the gyroscope unit and the magnetometer unit, input the one or more parameters of the drill bit motion into a formation property prediction model, and output one or more properties of the formation.

Statement 13. The system of statement 12, wherein the information handling system is further configured to update the formation property prediction model based at least in part on the output of the one or more properties of the formation.

Statement 14. The system of statements 12 or 13, wherein the formation property prediction model is configured to output gamma concentration in response to an input of at least one a bit wobble, a bit whirl, or revolutions-per-minute.

Statement 15. The system of statements 12-14, wherein the formation property prediction model is configured to output hole shape in response to an input of at least one of a bit whirl or a bit wobble.

Statement 16. The system of statements 12-15, wherein the gyroscope unit, the magnetometer unit, or an accelerometer measure angular velocity about at least two axes of the drill bit.

Statement 17. The system of statements 12-16, wherein the gyroscope unit, the magnetometer unit, or an accelerometer measure a bit wobble and the gyroscope unit is configured to measure pitch and yaw of the drill bit.

Statement 18. The system of statements 12-17, wherein the gyroscope unit, the magnetometer unit, or an accelerometer measure revolutions-per-minute and wherein the gyroscope unit is configured to measure roll of the drill bit.

Statement 19. The system of statement 18, wherein the information handling system is further configured to calculate stick slip from the revolutions-per-minute measurements.

Statement 20. The system of statements 12-18, wherein the gyroscope unit, the magnetometer unit, or an accelerometer measure a bit wobble.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited. Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for formation property prediction, comprising:
    drilling a borehole into a formation using a drill bit, wherein the drill bit comprises a shank, a bit body, and a through bore that traverses through the shank and the bit body;
    measuring one or more parameters of drill bit motion with one or more sensors disposed on an outer surface and within the shank or the bit body, wherein the one or more sensors are connected to a sensor subassembly by one or more channels that are inside the bit body, wherein the sensor subassembly is attached to an inner surface of the through bore adjacent to the one or more sensors; and
    inputting the one or more parameters of the drill bit motion into a formation property prediction model which outputs one or more properties of the formation.

2. The method of claim 1, further including altering the drilling of the borehole based at least in part on the outputs of the one or more properties of the formation.

3. The method of claim 1, wherein the formation property prediction model outputs gamma concentration, wherein the one or more parameters of the drill bit motion include at least one a bit wobble, a bit whirl, or revolutions-per-minute.

4. The method of claim 1, wherein the formation property prediction model outputs hole shape, wherein the one or more parameters include at least one of a bit whirl or a bit wobble.

5. The method of claim 1, further including updating the formation property prediction model with one or more additional drill bit measurements.

6. The method of claim 5, wherein the one or more parameters of the drill bit motion are measured with the one or more sensors that include at least one of an accelerometer, a magnetometer unit, or a gyroscope unit.

7. The method of claim 1, wherein the one or more parameters of the drill bit motion are measured with the one or more sensors that include a gyroscope unit configured to measure pitch and yaw of the drill bit.

8. A method for forming a formation property model, comprising: acquiring one or more formation properties and one or more parameters of drill bit motion using one or more sensors disposed on an outer surface and within a shank or a bit body of a drill bit, the drill bit comprising a through bore that traverses through the shank and the bit body, wherein the one or more sensors are connected to a sensor subassembly by one or more channels that are inside the bit body, wherein the sensor subassembly is attached to an inner surface of the through bore adjacent to the one or more sensors;
    forming one or more data packets that comprise the one or more formation properties and the one or more parameters of drill bit motion;
    storing the one or more data packets in a database; and
    correlating the one or more data packets in the database to form the formation property prediction model that predicts a formation property based at least in part on drill bit measurements.

9. The method of claim 8, further comprising updating the data packets with the drill bit measurements.

10. The method of claim 8, wherein the formation property prediction model predicts gamma concentration in response to an input of at least one a bit wobble, a bit whirl, or revolutions-per-minute.

11. The method of claim 8, wherein the formation property prediction model outputs hole shape in response to an input of at least one of a bit whirl or a bit wobble.

12. A system comprising:
- a drill bit, wherein the drill bit comprises a shank, a bit body, and a through bore that traverses through the shank and the bit body;
- one or more sensors disposed on an outer surface and within the shank or the bit body are connected to a sensor subassembly by one or more channels that are inside the bit body, wherein the sensor subassembly is attached to an inner surface of the through bore;
- a gyroscope unit coupled to the drill bit in a known positional relationship;
- a magnetometer unit coupled to the drill bit; and
- an information handling system configured to:
record one or more parameters of a drill bit motion from at least the gyroscope unit and the magnetometer unit;
input the one or more parameters of the drill bit motion into a formation property prediction model; and
output one or more properties of the formation.

13. The system of claim 12, wherein the information handling system is further configured to update the formation property prediction model based at least in part on the output of the one or more properties of the formation.

14. The system of claim 12, wherein the formation property prediction model is configured to output gamma concentration in response to an input of at least one a bit wobble, a bit whirl, or revolutions-per-minute.

15. The system of claim 12, wherein the formation property prediction model is configured to output hole shape in response to an input of at least one of a bit whirl or a bit wobble.

16. The system of claim 12, wherein the gyroscope unit, the magnetometer unit, or an accelerometer measure angular velocity about at least two axes of the drill bit.

17. The system of claim 12, wherein the gyroscope unit, the magnetometer unit, or an accelerometer measure a bit wobble and the gyroscope unit is configured to measure pitch and yaw of the drill bit.

18. The system of claim 12, wherein the gyroscope unit, the magnetometer unit, or an accelerometer measure revolutions-per-minute and wherein the gyroscope unit is configured to measure roll of the drill bit.

19. The system of claim 18, wherein the information handling system is further configured to calculate stick slip from the revolutions-per-minute measurements.

20. The system of claim 12, wherein the gyroscope unit, the magnetometer unit, or an accelerometer measure a bit wobble.

* * * * *